(12) United States Patent
Woo et al.

(10) Patent No.: US 12,226,994 B2
(45) Date of Patent: Feb. 18, 2025

(54) MULTILAYER SHEET AND MULTILAYER ELECTRONIC DEVICE

(71) Applicant: SK microworks solutions Co., Ltd., Cheonan-si (KR)

(72) Inventors: Seok-Jong Woo, Cheonan-si (KR); Jun-Ki Park, Cheonan-si (KR); Hyung-Woo Cho, Cheonan-si (KR); Seung-Yong Pyun, Cheonan-si (KR)

(73) Assignee: SK microworks solutions Co., Ltd., Cheonan-si (KR)

( * ) Notice: Subject to any disclaimer, the term of this patent is extended or adjusted under 35 U.S.C. 154(b) by 204 days.

(21) Appl. No.: 17/977,189

(22) Filed: Oct. 31, 2022

(65) Prior Publication Data

US 2023/0271404 A1    Aug. 31, 2023

(30) Foreign Application Priority Data

Feb. 28, 2022   (KR) .................. 10-2022-0025998

(51) Int. Cl.
*B32B 7/12* (2006.01)
*B32B 27/06* (2006.01)
*B32B 27/20* (2006.01)
*B32B 27/28* (2006.01)
(Continued)

(52) U.S. Cl.
CPC .............. *B32B 7/12* (2013.01); *B32B 27/06* (2013.01); *B32B 27/20* (2013.01); *B32B 27/281* (2013.01); *B32B 27/34* (2013.01); *B32B 27/36* (2013.01); *B32B 2255/10* (2013.01); *B32B 2255/26* (2013.01); *B32B 2264/1021* (2020.08); *B32B 2264/104* (2013.01); *B32B 2307/412* (2013.01); *B32B 2307/51* (2013.01); *B32B 2307/732* (2013.01); *B32B 2307/748* (2013.01); *B32B 2457/00* (2013.01)

(58) Field of Classification Search
CPC .......... B32B 7/12; B32B 27/06; B32B 27/20; B32B 27/281; B32B 27/34; B32B 27/36; B32B 2255/10; B32B 2255/26; B32B 2264/1021; B32B 2264/104; B32B 2307/412; B32B 2307/51; B32B 2307/732; B32B 2307/748; B32B 2457/00; B32B 2255/28; B32B 2307/7376; B32B 27/285; B32B 2307/54; B32B 2571/00; B32B 27/08; B32B 7/06; B32B 2037/1253; B32B 2309/105; B32B 2457/20

See application file for complete search history.

(56) References Cited

U.S. PATENT DOCUMENTS

2005/0100820 A1 *   5/2005   Satake ............... G02B 1/14
                                                         430/14

FOREIGN PATENT DOCUMENTS

| JP | 2005-125659 A | 5/2005 |
| JP | 2015-193739 A | 11/2015 |
| JP | 2022-155414 A | 10/2022 |

(Continued)

*Primary Examiner* — Patricia L. Nordmeyer
(74) *Attorney, Agent, or Firm* — NSIP Law (57) ABSTRACT

A multilayer sheet including: a transparent film with a total light transmittance of 85% or more in accordance with ISO 13468; a coating layer disposed on a first surface of the transparent film; and an adhesive layer disposed on a second surface, opposite to the first surface, of the transparent film, wherein a thickness of the adhesive layer after being cured is two times or less of a thickness of the coating layer, is disclosed.

19 Claims, 2 Drawing Sheets

(51) Int. Cl.
    *B32B 27/34*           (2006.01)
    *B32B 27/36*           (2006.01)

(56) References Cited

FOREIGN PATENT DOCUMENTS

| KR | 10-2011-0007895 A | 1/2011 |
| KR | 10-1114277 B1 | 2/2012 |
| KR | 10-2016-0078888 A | 7/2016 |
| KR | 10-1798759 B1 | 12/2017 |
| KR | 10-1810422 B1 | 12/2017 |
| KR | 10-1976902 B1 | 5/2019 |
| KR | 10-1993002 B1 | 6/2019 |

\* cited by examiner

MULTILAYER SHEET AND MULTILAYER ELECTRONIC DEVICE

CROSS-REFERENCE TO RELATED APPLICATIONS

This application claims the benefit under 35 U.S.C. 119(a) of Korean Patent Application No. 10-2022-0025998 filed on Feb. 28, 2022 in the Korean Intellectual Property Office, the entire disclosure of which is incorporated herein by reference for all purposes.

BACKGROUND

1. Field

The present disclosure relates to a multilayer sheet applicable as a protector of an electronic device such as a display and a multilayer electronic device including the same.

2. Description of Related Art

As mobile devices such as a mobile phone, a smart phone, and a tablet, and devices for data processing like ATM and a kiosk are diversified, a surface protective sheet is widely used. Also, display devices in various shapes such as foldable, flexible, rollable, etc., are introduced and accordingly, sufficient durability against repetitive folding, rolling, and the like is required in addition to the requirement of the surface roughness for suppressing scratches on the surface. Additionally, optical properties are certainly required when the protective sheet applied to a display screen.

SUMMARY

In one general aspect, a multilayer sheet according to an embodiment includes a transparent film with a total light transmittance of 85% or more in accordance with ISO 13468; a coating layer disposed on a first surface of the transparent film; and an adhesive layer disposed on a second surface, opposite to the first surface, of the transparent film, wherein a thickness of the adhesive layer after being cured is two times or less of a thickness of the coating layer.

The adhesive layer may have an adhesive force of 80 gf/inch or more per unit thickness (1 μm).

When a storage modulus of a laminate consisting of the transparent film and the coating layer disposed on the first surface of the transparent film is referred to as SMm and a storage modulus of the adhesive layer is referred to as SMa, a difference between the SMa and the SMm at 0° C. may be 2450 MPa or less.

The storage modulus of the adhesive layer may be 0.1 MPa or more at 60° C.

When a storage modulus of a laminate consisting of the transparent film and the coating layer disposed on the first surface of the transparent film is referred to as SMm and a storage modulus of the adhesive layer is referred to as SMa, a difference between the Sma and the SMm at 60° C. may be 2200 Mpa or less.

The adhesive layer may have an adhesive force of 200 gf/inch or more after being cured.

The adhesive layer may have a thickness of more than 1 μm after being cured.

The adhesive layer may include a silicon-based curable adhesive layer or a precursor layer thereof.

A sum of thicknesses of the coating layer and the adhesive layer may be 30 μm or less.

The adhesive layer may be a layer made by curing of a silicon adhesive and a silicon MQ resin.

The multilayer sheet may further include a release film disposed on a surface of the adhesive layer, wherein the adhesive layer is disposed between the transparent film and the release film.

In another general aspect, a multilayer electronic device according to another embodiment includes: a multilayer sheet including: a transparent film with a total light transmittance of 85% or more in accordance with ISO 13468; a coating layer disposed on a first surface of the transparent film; and an adhesive layer disposed on a second surface, opposite to the first surface, of the transparent film; and a radiant functional layer disposed on a surface of the adhesive layer of the multilayer sheet, wherein the adhesive layer is disposed between the transparent film and the radiant functional layer.

A thickness of the adhesive layer after being cured may be two times or less of a thickness of the coating layer.

The adhesive layer may an adhesive force of 80 gf/inch or more per unit thickness (1 μm).

When a storage modulus of a laminate consisting of the transparent film and the coating layer disposed on the first surface of the transparent film is referred to as SMm and a storage modulus of the adhesive layer is referred to as SMa, a difference between the SMa and the SMm at 0° C. may be 2450 MPa or less.

The storage modulus of the adhesive layer may be 0.1 MPa or more at 60° C.

The adhesive layer may have an adhesive force of 200 gf/inch or more after being cured.

The adhesive layer may include a silicon-based curable adhesive layer or a precursor layer thereof.

A sum of thicknesses of the coating layer and the adhesive layer may be 30 μm or less.

The multilayer electronic device may further include an elastic layer disposed between the adhesive layer and the radiant functional layer.

Other features and aspects will be apparent from the following detailed description and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

In this disclosure, the phrase that a certain element "comprises" or "includes" another element means that the certain element may further include one or more other elements but does not preclude the presence or addition of one or more other elements, unless stated to the contrary.

In this disclosure, when an element is referred to as being "connected" to another element, it can be understood not only as a case of a certain element directly connected to the other element but also as a case of having other elements interposed therebetween.

In this disclosure, "B being placed on A" means that B is placed in direct contact with A or placed over A with another layer or structure interposed therebetween and thus should not be interpreted as being limited to B being placed in direct contact with A.

"on (over)" and under (beneath) express relative position, and this disclosure may disclose the examples referring the Drawing, but not limited by the Drawing.

In this disclosure, the phrase "combination(s) thereof" included in a Markush-type expression denotes one or more mixtures or combinations selected from the group consisting of components stated in the Markush-type expression, that is, denotes one or more components selected from the group consisting of the components are included.

In this disclosure, the description of "A and/or B" means "A, B, or A and B."

In this disclosure, terms such as "first", "second", "A", or "B" are used to distinguish the same terms from each other unless specially stated otherwise.

In this disclosure, a singular form is contextually interpreted as including a plural form as well as a singular form unless specially stated otherwise.

In this disclosure, the storage modulus was measured in a range of −50° C. to 100° C. by DMA7100 model available from HITACHI corporation in accordance with ASTM D4065. The heating rate is based on 5° C./min.

In this disclosure, the in-plane retardation (Ro) is a parameter defined as the product of anisotropy of refractive rates of two axes crossing from each other in a plane of a measuring target (film or sheet, referred to as a film below) ($\Delta nxy=|nx-ny|$) and the film thickness (d) thereof ($\Delta nxy \times d$), and this is a measure for showing optical isotropy or anisotropy. In addition, the minimum in-plane retardation (Romin) refers to the lowest value when the in-plane retardation (Ro) is measured at plural points within a plane of the film, respectively.

In this disclosure, the thickness direction retardation (Rth) is a parameter defined as the average of the retardation obtained by multiplying the film thickness (d) by two birefringence values, $\Delta nxy(=|nx-ny|)$ and $\Delta nyz(=|ny-nz|)$, respectively, when viewed at a section in the film thickness direction. In addition, the maximum thickness direction retardation (Rthmax) refers to the highest value when the thickness direction retardation (Rth) is measured at plural points within a plane of the film, respectively.

In this disclosure, the character and/or the number written with the name of a compound refers to the abbreviation for the compound.

In this disclosure, the relative size, thickness, and the like of a component expressed in a drawing may be expressed exaggeratedly for convenience in descriptions.

Hereinafter, a multilayer film according to an embodiment will be described in further detail.

The objective of the present disclosure relates to a multilayer sheet and a multilayer electronic device. The multilayer sheet is useful as a protector for a display.

A multilayer sheet and a multilayer electronic device according to the present disclosure do not cause delamination from materials even after repetitive folding or rolling, and has an excellent surface roughness against scratching, puncturing, etc. The multilayer sheet may be used in a cover sheet for a display and very useful to a multilayer electronic device.

Figure 1:
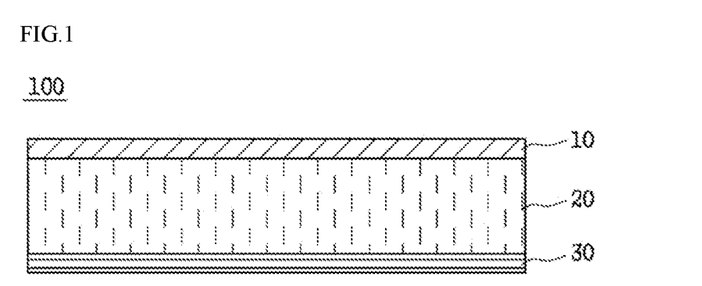
FIG. 1 is a conceptual sectional view for illustrating the structure of a multilayer sheet according to one embodiment.
Figure 2:
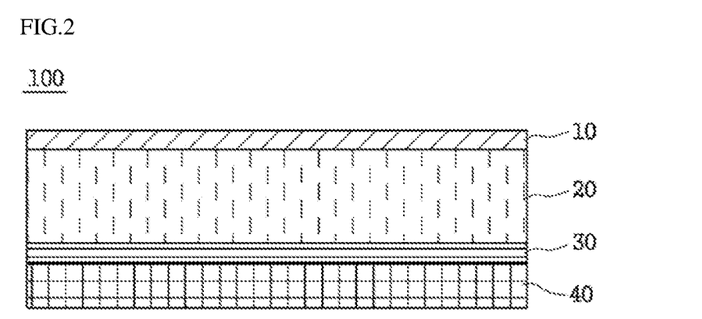
FIG. 2 is a conceptual sectional view for illustrating the structure of a multilayer sheet according to another embodiment.

FIG. 1 is a conceptual sectional view for illustrating the structure of a multilayer sheet according to one embodiment, and FIG. 2 is a conceptual sectional view for illustrating the structure of a multilayer sheet according to another embodiment.

In a general aspect, a multilayer sheet 100 according to one embodiment of the present disclosure includes a transparent film 20; a coating layer 10 disposed on a first surface of the transparent film 20; and adhesive layer 30 disposed on a second surface, which is opposite to the first surface, of the transparent film 20.

The multilayer sheet 100 may further include a release film 40 disposed on a surface of the adhesive layer 30, wherein the adhesive layer 30 is disposed between the transparent film 20 and the release film 40.

An elastic layer 42 may be further disposed under the adhesive layer 30.

Transparent Film 20

A transparent film 20 is a supporter of a multilayer sheet 100, and may be used as a base layer of a coating layer 10 and an adhesive layer 30.

The transparent film 20 is a film having a total light transmittance of 85% or more in accordance with ISO 13468. The transparent film 20 may have a light transmittance of 85% or more. For example, the light transmittance may be 88% or more, 89% or more, or 99% or less. However, the light transmittance is not limited thereto, if the light transmittance is applicable to a supporting layer of a display cover film.

The transparent film 20 may have haze of 3% or less. For example, the haze may be 2% or less, 1.5% or less, or 1% or less. The haze may be more than 0%. In such a case, the multilayer film may be further transparent.

The transparent film 20 may have a yellow index (YI) of 3 or less. For example, the yellow index may be 3 or less, 2.8 or less, 2.2 or less, 1.0 or less, 0.8 or less, or 0.5 or less. Also, the yellow index may be more than 0.

The transparent film 20 may have an excellent characteristic in retardation.

The transparent film 20 may have an in-plane retardation (Ro) of 600 nm or less, 500 nm or less, 400 nm or less, 300 nm or less, or 200 nm or less. When the in-plane retardation (Ro) is within the above range, the possibility of the occurrence of a rainbow stain when applying the multilayer sheet 100 to the front of a display, depending on the viewing angle, may be reduced to the minimum.

The transparent film 20 may have a minimum in-plane retardation ($Ro_{min}$) of 200 nm or less or 150 nm or less. In detail, the minimum in-plane retardation may be 120 nm or less, 100 nm or less, 85 nm or less, 75 nm or less, or 65 nm or less.

The transparent film 20 may have the lowest limit of 0 nm in in-plane retardation. Alternatively, the lowest limit of the in-plane retardation (Ro) may be adjusted as 10 nm or more, 30 nm or more, or 50 nm or more for balance of the optical properties and mechanical properties of the transparent film 20.

The transparent film 20 may have a thickness direction retardation (Rth) of 4,000 or more, 5,000 nm or more, or 5,500 nm or more.

The transparent film 20 may have a maximum thickness direction retardation ($Rth_{max}$) of 6,000 nm or more. For example, the maximum thickness direction retardation may be 6,500 nm or more, 7,500 nm or more, 8,000 nm or more, or 8,500 nm or more.

The transparent film 20 may have a ratio of the thickness direction retardation (Rth) to the in-plane retardation (Ro) (Rth/Ro) of 10 or more, 15 or more, or 20 or more. When the in-plane retardation (Ro) is smaller, preventing the generation of a rainbow stain is more convenient and when the thickness direction retardation (Rth) is greater, preventing the generation of a rainbow stain is more convenient. Therefore, it is advantageous when the ratio of two numerical values is maintained to be large.

The transparent film 20 may have a ratio of the maximum thickness direction retardation ($Rth_{max}$) to the minimum in-plane retardation ($Ro_{min}$) ($Rth_{max}/Ro_{min}$) of 30 or more, 40 or more, 50 or more, or 60 or more.

In the transparent film 20 having the characteristics described above, the molecules have a high alignment degree and the crystallization thereof is promoted, and therefore, the film may have mechanical properties of a proper level or more, and may suppress the possibility of generating a rainbow stain. The retardation is based on a value measured from a transparent film 20 with a thickness of 40 µm to 50 µm.

The transparent film 20 may have a tensile strength of 15 kgf/mm$^2$ or more. In detail, the tensile strength may be 18 kgf/mm$^2$ or more, 20 kgf/mm$^2$ or more, 21 kgf/mm$^2$ or more, or 22 kgf/mm$^2$ or more.

The transparent film 20 may have an elongation of 15% or more. In detail, the elongation of 16% or more, 17% or more, or 17.5% or more.

The transparent film 20 may have a modulus of 2.5 GPa or more. For example, the modulus may be 3 GPa or more, 3.5 GPa or more, 3.8 GPa or more, or 4.0 GPa or more. The modulus may be 10 GPa or less, or 8 GPa or less.

The transparent film 20 may have a compressive strength of 0.4 kgf/µm or more. In detail, the compressive strength may be 0.45 kgf/µm or more, or 0.46 kgf/µm or more.

As the transparent film 20, a polyester-based film may be used.

As the transparent film 20, a polyimide-based film may be used.

As the transparent film 20, a polyamide-based film may be used.

As the transparent film 20, a polyimide-amide-based film may be used.

For example, the transparent film 20 may be a transparent polyester-based film.

The polyester-based film may include a polyester-based resin.

The polyester-based resin may be a homopolymer resin or a copolymer resin, in which dicarboxylic acid and diol have been polymerized and condensed. Also, the polyester-based resin may be a blend resin, in which the homopolymer resin or the copolymer resin have been mixed.

As examples of the dicarboxylic acid, there are terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenyl carboxylic acid, diphenoxyethanedicarboxylic acid, diphenylsulfonecarboxylic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, sebacic acid, suberic acid, and dodecadicarboxylic acid.

In addition, as examples of the diol, there are ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, and bis(4-hydroxyphenyl)sulfone.

Preferably, the polyester-based resin may be an aromatic polyester-based resin having great crystallinity, and for example, a polyethylene terephthalate (PET) resin may be a main ingredient thereof.

When the transparent film 20 is a polyester-based film, the polyester-based film may include a polyester-based resin, specifically, a PET resin of about 85 wt % or more may be included, and more specifically, the PET resin of 90 wt % or more, 95 wt % or more, or 99 wt % or more may be included. As another example, the polyester-based film may further include another polyester-based resin except for a PET resin. Specifically, the polyester-based film may further include a polyethylene naphthalate (PEN) resin of about 15 wt % or less. More specifically, the polyester-based film may further include a PEN resin of about 0.1 wt % to 10 wt %, or a PEN resin of about 0.1 wt % to 5 wt %.

Depending on the composition, the crystallization degree of a polyester-based film goes up in a manufacturing process passing through heating, stretching, and the like, and the mechanical properties such as tensile strength can be improved.

The transparent film 20 may further include a filler besides the polyester-based resin.

The filler may be one or more kind selected from the group consisting of barium sulfate, silica, and carbon calcium. The transparent film 20 includes the filler, thereby roughness and winding of the film can be increased, and additionally, the visibility and the degree of scratches can be improved when a film is manufactured.

The filler may have a diameter of 0.01 µm or more and less than 1.0 µm. For example, the filler may have a diameter of 0.05 µm to 0.9 µm or a diameter of 0.1 µm to 0.8 µm, but is not limited thereto.

The filler may be included in an amount of 0.01 to 3 wt % based on a total weight of the transparent film 20. For example, the filler may be included in an amount of 0.05 to 2.5 wt %, 0.1 to 2 wt %, or 0.2 to 1.7 wt % based on a total weight of the transparent film, but is not limited thereto.

The transparent film 20 may have a thickness of 15 µm or more, 20 µm or more, 30 µm or more, 40 µm or more, 55 µm or more, 65 µm or more, 75 µm or more, or 100 µm or more, and additionally, the thickness may be 500 µm or less, 400 µm or less, 300 µm or less, 200 µm or less, 120 µm or less, 95 µm or less, or 85 µm or less. As a detailed example, the transparent film 20 may have a thickness of 15 µm to 120 µm, a thickness of 20 µm to 95 µm, or a thickness of 25 µm to 85 μm. In such a thickness range, excellent optical properties can be obtained in addition to sufficient mechanical properties.

A manufacturing method of a transparent film may be a conventional manufacturing method of a transparent film.

For example, a polyester film may be manufactured by a method including (1) an operation of obtaining a non-stretched film by extruding a composition including a polyester film; (2) an operation of stretching the non-stretched film in the length direction and the width direction; and (3) an operation of thermally fixing the stretched film.

In the manufacturing method, a non-stretched film is manufactured by extruding a raw material resin and passing it through preheating, stretching, and thermally fixing. Also, the extruding may be performed under the temperature condition of 230° C. to 300° C., or 250° C. to 280° C.

The non-stretched film is preheated at a certain temperature before being stretched. The range of the temperature for preheat may be a range satisfying the range of Tg+5° C. to Tg+50° C. based on Glass Transition Temperature (Tg) of the polyester resin, and at the same time, satisfying the range of 70° C. to 90° C. When in the above range, the non-stretched film may secure a flexibility for easy stretching, and at the same time, the phenomenon of fracture during stretching may be effectively prevented.

The stretching is performed by bi-axial stretching, and for example, the stretching may be performed through simultaneous bi-axial stretching or axial retardation bi-axial stretching by two axes in the width direction (transverse direction, TD) and the length direction (mechanical direction, MD). Preferably, axial retardation bi-axial stretching, which is performed by first stretching in one direction and stretching in the direction perpendicular to the earlier direction, may be performed.

The stretching ratio in the length direction is in a range of 2.0 to 5.0, and more specifically, the stretching ratio may be in a range of 2.8 to 3.5. Also, the stretching ratio in the width direction is in a range of 2.0 to 5.0, and more specifically, the stretching ratio may be in a range of 2.9 to 3.7. Preferably, the stretching ratio (d1) in the length direction and the stretching ratio (d2) is similar, and in detail, the ratio (d2/d1) of the stretching ratio (d2) in the length direction with respect to the stretching ratio (d1) in the width direction may be 0.5 to 1.0, 0.7 to 1.0, or 0.9 to 1.0. The stretching ratio (d1, d2) is a ratio showing the length after stretching when the length before stretching is designated as 1.0. In addition, the speed of the stretching may be 6.5 m/min to 8.5 m/min, but the speed is not limited thereto.

The stretched sheet may be thermally fixed at 150° C. to 250° C., and more specifically at 160° C. to 230° C. The thermally fixing may be performed for 5 seconds to 1 minute, and more specifically, it may be performed for 10 seconds to 45 seconds.

After thermal fixing is initiated, a film may be relaxed in the length direction and/or the width direction, and at this time, the temperature range may be 150° C. to 250° C.

Coating Layer 10

A coating layer 10 may be disposed on one surface of the transparent film 20.

The lower surface of the coating layer 10 may face the transparent film 20, and the upper surface of the coating layer may be the outermost surface exposed to the external of the multilayer sheet.

The lower surface of the coating layer 10 may contact the transparent film 20, or may be bonded with the transparent film 20 with an additional layer as a medium.

The coating layer 10 may directly contact one surface of the transparent film 20.

The coating layer 10 may enhance the mechanical properties and/or optical properties of the transparent film 20.

The coating layer 10 may include at least one material for coating selected from the group consisting of organic ingredients, inorganic ingredients, and composite ingredients of organics and inorganics.

The material for coating may include an organic resin. Specifically, the organic resin may be a curable resin, or a binder resin.

The coating layer 10 may be a curable coating layer.

The coating layer 10 may include one or more kind selected from the group consisting of a urethane acrylate-based compound, an acryl ester-based compound, an acrylate-based compound, an epoxy acrylate-based compound, and the cured products thereof.

The coating layer 10 may include at least one selected from the group consisting of a urethane acrylate-based compound, an acryl ester-based compound, and the cured products thereof.

The coating layer 10 may include at least one selected from the group consisting of a urethane acrylate-based compound, an acryl ester-based compound, an acrylate-based compound, and the cured products thereof.

The urethane acrylate-based compound may include urethane bond as a repeating unit, and may have a plurality of functional groups.

The urethane acrylate-based compound may be obtained by substitution of the end of a urethane compound formed by reaction of a diisocyanate compound and polyol into an acrylate group.

For example, the diisocyanate compound may include at least one selected from the group consisting of a straight type, a branched chain type, and a ring type aliphatic diisocyanate compounds having carbon atoms of 4 to 12 and aromatic diisocyanate compounds having carbon atoms of 6 to 20. The polyol may include two to four hydroxyl groups (—OH), and may be a straight chain type, a branched chain type, or a ring type aliphatic polyol compound having carbon atoms of 4 to 12, or an aromatic polyol compound having carbon atoms of 6 to 20. The substitution for the end by the acrylate group may be performed by an acrylate-based compound having a functional group enabling reaction with an isocyanate group (—NCO). For example, an acrylate-based compound having a hydroxyl group, an amine group, and the like may be used, and hydroxyalkyl acrylate or aminoalkyl acrylate having carbon atoms of 2 to 10 may be used.

The urethane acrylate-based compound may include two to fifteen functional groups.

As examples of the urethane acrylate-based compound, there are a di-functional urethane acrylate oligomer having a weight average molecular weight of 1400 to 25000, a tri-functional urethane acrylate oligomer having a weight average molecular weight of 1700 to 16000, a tetra-functional urethane acrylate oligomer having a weight average molecular weight of 500 to 2000, a hexa-functional urethane acrylate oligomer having a weight average molecular weight of 818 to 2600, a mono-functional urethane acylate oligomer having a weight average molecular weight of 2500 to 5500, a deca-functional urethane acylate oligomer having a weight average molecular weight of 3200 to 3900, a pentadeca-functional urethane acylate oligomer having a weight average molecular weight of 2300 to 20000, but is not limited thereto.

The urethane acrylate-based compound may have a Glass Transition Temperature (Tg) of −80° C. to 100° C., −80° C. to 90° C., −80° C. to 80° C., −80° C. to 70° C., −80° C. to 60° C., −70° C. to 100° C., −70° C. to 90° C., −70° C. to 80° C., −70° C. to 70° C., −70° C. to 60° C., −60° C. to 100° C., −60° C. to 90° C., −60° C. to 80° C., −60° C. to 70° C., −60° C. to 60° C., −50° C. to 100° C., −50° C. to 90° C., −50° C. to 80° C., −50° C. to 70° C., or −50° C. to 60° C.

The acryl ester-based compound may be one or more kind selected from the group consisting of substituted or unsubstituted acrylates and substituted or unsubstituted methacrylates. The acryl ester-based compound may include one to ten functional groups.

As examples of the acryl ester-based compound, there are trimethylolpropane triacrylate (TMPTA), trimethylolpropaneethoxy triacrylate (TMPEOTA), glycerin propoxylated triacrylate (G PTA), pentaerythritol tetraacrylate (PETA), dipentaerythritol hexaacrylate (DPHA), but is not limited thereto.

The acryl ester-based compound may have a weight average molecular weight of 500 to 6,000, 500 to 5,000, 500 to 4,000, 1000 to 6,000, 1000 to 5,000, 1000 to 4,000, 1500 to 6,000, 1500 to 5,000, or 1500 to 4,000. The equivalent of acrylate in the acryl ester-based compound may be a value of 50 g/eq to 300 g/eq, 50 g/eq to 200 g/eq, or 50 g/eq to 150 g/eq.

The acrylate-based compound may include one to ten functional groups. As examples of the acrylate-based compound, there are a mono-functional acrylate oligomer having a weight average molecular weight of 100 to 300, a di-functional acrylate oligomer having a weight average molecular weight of 250 to 2000, and an epoxy acrylate oligomer having a weight average molecular weight of 1000 to 3000.

The epoxy acrylate-based compound may include one to ten functional groups. As examples of the epoxy acrylate-based compound, there are a mono-functional acrylate oligomer having a weight average molecular weight of 100 to 300, a di-functional epoxy acrylate oligomer having a weight average molecular weight of 250 to 2000, and a tetra-functional epoxy acrylate oligomer having a weight average molecular weight of 1000 to 3000, but is not limited thereto. The equivalent of epoxy in the epoxy acrylate-based compound may be a value of 50 g/eq to 300 g/eq, 50 g/eq to 200 g/eq, or 50 g/eq to 150 g/eq.

The amount of the organic resin may be 30 to 100 wt %, 40 to 90 wt %, or 50 to 80 wt % based on a total weight of a coating layer 10.

The coating layer 10 may optionally further include a filler.

The filler may be for example, inorganic particles. As examples of the filler, there are silica, barium sulfate, zinc oxide, and alumina. The filler may have a particle diameter of 1 nm of 100 nm. Specifically, the filler may have a particle diameter of 5 nm to 50 nm, or 10 nm to 30 nm. The filler may include a plurality of inorganic fillers different in the distribution of particle diameter. For example, the filler may include a first inorganic filler having a D50 value of 20 nm to 35 nm and a second inorganic filler having a D50 value of 40 nm to 130 nm. The amount of the filler may be 25 wt % or more, 30 wt % or more, or 35 wt % or more, based on a total weight of the coating layer. Also, the amount of the filler may be 50 wt % or less, 45 wt % or less, or 40 wt % or less, based on a total weight of the coating layer 10. Preferably, the coating layer 10 may not include an inorganic filler such as silica. In such a case, for example, the adhesive force between the transparent film 20 and the coating layer with the composition described above may be enhanced.

The coating layer 10 may include a light initiator or the reactant thereof. The light initiator may influence a process of curing the resin and the like to be a coating layer.

As examples of the light initiator, there are 1-hydroxy-cyclohexyl-phenyl ketone, 2-hydroxy-2-methyl-1-phenyl-1-propanone, 2-hydroxy-1-[4-(2-hydroxyethoxy)phenyl]-2-Methyl-1-propanone, methylbenzoylformate, α,α-dimethoxy-α-phenylacetophenone, 2-benzoyl-2-(dimethylamino)-1-[4-(4-morpholinyl) Phenyl]-1-butanone, 2-methyl-1-[4-(methylthio)phenyl]-2-(4-morpholinyl)-1-propanone diphenyl (2,4,6-trimethylbenzoyl)-phosphine oxide, and bis (2,4,6-trimethylbenzoyl)-phenylphosphine oxide, but is not limited thereto. In addition, as commercial product, there are Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. The light initiator may be used alone or may be used by mixing two kinds or more.

The coating layer 10 may further include functionalities such as anti-glare, anti-fouling, and anti-static.

The coating layer 10 may further include an antifoulant. For example, the coating layer 10 may include a fluorine-based compound. The fluorine-based compound may function as an antifoulant. Specifically, the fluorine-based compound may be an acrylate-based compound having a perfluorohexylethyl acylate-based alkyl group, and as a specific example, may be perfluorohexylethyl acrylate, but is not limited thereto.

The coating layer 10 may further include an antistatic agent. The antistatic agent may include an ion-based surfactant. For example, the ion-based surfactant may include an ammonium salt or a quaternary alkyl ammonium salt, and the ammonium salt and quaternary alkyl ammonium salt may include a halogenide halide such as chloride or bromide.

The coating layer 10 may include an additive such as a surfactant, a UV absorber, a UV stabilizer, a yellowing inhibitor, a leveling agent, or a pigment for improving a color value. For example, the surfactant may be a mono or di functional fluorine-based acrylate, a fluorine-based surfactant, or a silicon-based surfactant. The surfactant may be included in the state of being dispersed or cross-linked in the coating layer 10. For example, the UV absorber may be a benzophenone-based compound, a benzotriazole-based compound, or a triazine-based compound, and as the UV stabilizer may be tetramethyl piperidine. The amounts of the above additives may be adjusted differently within a range not to degrade the properties of the coating layer. For example, the amount of the additive may be 0.01 to 10 wt % based on the weight of the entire coating layer, but is not limited thereto.

The coating layer 10 may include a monolayer or two or more layers.

The coating layer 10 may include a monolayer, and may have functionalities of anti-fingerprint and anti-stain at the same time in addition to enhancing the surface durability of the multilayer sheet.

The coating layer 10 may have a thickness of 2 μm or more, 3 μm or more, 5 μm or more, or 10 μm or more, and the thickness may also be 50 μm or less, 30 μm or less, 20 μm or less, or 10 μm or less. When having such a thickness, the multilayer sheet is applicable in a thin thickness, and simultaneously, the above condition may give the multilayer sheet a durability such as surface roughness up to a level suitable for the multilayer sheet, in addition to maintaining flexibility of the multilayer sheet overall.

The coating layer 10 may be formed by a manufacturing method of a coating layer.

The manufacturing method of a coating layer may include an operation of curing a composition for manufacturing a coating layer after coating the composition.

The composition for manufacturing a coating layer may include at least one selected from the group consisting of organic resin composition, an inorganic resin composition, and a composite composition of organics and inorganics.

The composition for manufacturing a coating layer may include at least one selected from the group consisting of an acrylate-based compound, a siloxane compound, and a silsesquioxane compound. Also, inorganic particles may further be included.

The composition for manufacturing a coating layer may include a urethane acrylate-based compound, an acryl ester-based compound, and a fluor-based compound, as a specific example.

Additionally, the composition for manufacturing a coating layer may further include a light initiator, an anti-fouling additive, an antistatic agent, another additive and/or an organic solvent.

As the organic solvent, alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; or aromatic solvents such as benzene, toluene, and xylene may be used alone or mixed.

The amount of the organic solvent may be adjusted differently within a range not to degrade the properties of a coating layer and the amount is not specially limited. However, the organic solvent may be included to have a ratio of about 1:1 to 250 for solid ingredients: organic solvents, based on the solid ingredients among ingredients included in the composition for manufacturing a coating layer. When the organic solvent is within the above range, a proper fluidity and applicability can be obtained.

The composition for manufacturing a coating layer may include an organic resin in an amount of 10 to 30 wt %, a light initiator in an amount of 0.1 to 5, an anti-fouling additive in an amount of 0.01 to 2 wt %, an antistatic agent in an amount of 0.1 to 10 wt %, and an organic solvent in a residual amount.

When the above composition is applied, the mechanical properties and characteristics in anti-fouling and anti-static of the coating layer may be enhanced together.

The composition for manufacturing a coating layer may be applied on a transparent film in a conventional coating method and subsequently cured. A method of bar coating, knife coating, roll coating, blade coating, die coating, micro gravure coating, comma coating, slot die coating, lip coating, or solution casting is applicable as the coating method.

For the applied composition for manufacturing a coating layer, a drying process and a curing process may be performed in sequence or simultaneously.

The drying is a process of removing organic solvents from the applied composition for manufacturing a coating layer.

The drying may be performed under a temperature condition of 40° C. to 100° C., preferably, 40° C. to 80° C., 50° C. to 100° C., or 50° C. to 80° C., and may be performed for about 1 minute to 20 minutes, preferably, for 1 minute to 10 minute or 1 minute to 5 minutes.

The curing is a process of inducing chemical reaction of the composition for manufacturing a coating layer and thereby making coating membrane. Depending on a resin applied to a composition for manufacturing a coating layer, a proper light curing and/or heat curing method may be applied.

Adhesive Layer 30

An adhesive layer 30 is disposed on the other side of the transparent film 20.

One surface of the adhesive layer 30 faces the transparent film 20, may directly contact with the transparent film 20, or may be bonded with the transparent film with an additional layer as an intervening medium.

The other surface of the adhesive layer 30 may be exposed to the external, or may face one surface of a release film 40.

The other surface of the adhesive layer 30 may be bonded with the release film with another layer like an elastic layer 42 as an intervening medium.

The other surface of the adhesive layer 30 may be bonded with a radiant functional layer (150, refer to FIG. 3 and FIG. 4) with another layer like an elastic layer 42 as an intervening medium or without such a medium, and may be applied as some parts of a multilayer electronic device.

The adhesive layer 30 may be an optical transparent adhesive layer.

The adhesive layer 30 may be an acryl-based adhesive layer, a urethane-based adhesive layer, or a silicon-based adhesive layer, and specifically, a silicon-based adhesive layer may be used as the adhesive layer. When a silicon-based adhesive layer is used, it is possible to provide an adhesive layer having heat resistance, weatherability, and the like in addition to a high light transmittance. Particularly, the adhesive layer of an embodiment described below has a strong adhesive force even with a thin thickness, and enables improvement in the properties of the multilayer sheet, compared to conventional OCA (optically clear adhesive) such as an acryl-based adhesive layer.

The adhesive layer 30 may be one having a high adhesive force.

For maintaining the properties of a multilayer sheet against repetitive bending or folding, the performance of an adhesive layer for fixing films and layer while suppressing the occurrence of delamination must be improved, as well as the properties of a transparent film and a coating layer. Such an improved performance may be obtained by applying a silicon-based adhesive layer.

The silicon-based adhesive layer may be obtained by drying and/or curing a silicon adhesive composition, after applying thereof.

The silicon adhesive composition may include a silicon adhesive, a catalyst, and a solvent.

In an embodiment, to improve the adhesive force of a silicon-based adhesive layer, a silicon MG resin may further be included. At this time, the silicon MQ resin is a polymer having a siloxane skeleton and at least two or more methyl groups among cage-like oligosiloxanes indicated by a general expression of $RNSiXmOy$, where R may be an alkyl group having carbon atoms of 1 to 5 and includes at least two methyl group among them; X may be a hydrogen, a hydroxyl group, a chloride group, or an alkoxy group having carbon atoms of 1 to 5; and n, m, y are an integer of 2 to 200, respectively. In detail, M units (mono-terminated siloxane units) expressed by $R_1R_2X_3SiO_{1/2}$ and Q units (tetra-terminated siloxane units) expressed by $SiO_4/2$ may be included. The weight average molecular weight may be 2000 to 8000 g/mol. When a silicon MG resin is applied to an adhesive layer, the adhesive force may be improved, and particularly, an initial adhesive force may be improved.

A commercial silicon adhesive utilizable for optical objectives may be applied as the silicon adhesive. Specifically, a peroxide curable silicon adhesive may be applied, and an addition reactable silicon adhesive may be applied.

The peroxide curable silicon adhesive may be, for example, selected from the group consisting of KR-100, KR-101-10 and KR-130 available from Shin-Etsu Chemical Co., Ltd, DOWSIL SH 4280 available from The Dow Chemical Company, and SilGrip PSA 510 available from Momentive Performance Materials, or may be a product equivalent to the above.

The reactable silicon adhesive may be, for example, selected from the group consisting of KR-3700, KR-3701, X-40-3237, X-40-3240 and X-40-3291-1 available from Shin-Etsu Chemical Co., Ltd; DOWSIL SD4580, DOWSIL 4584, DOWSIL 4585 and DOWSIL 4587L available from The Dow Chemical Company; and SilGrip TSR1512, and TSR1516 available from Momentive Performance Materials, or may be a product equivalent to the above.

For the silicon adhesive, it may be advantageous to use a reactable silicon adhesive in that convenience in a process is increased.

A silicon MG resin may be applied with a silicon adhesive together, to enhance an adhesive force. As a silicon MQ resin, for example, X-92-128 or X-41-3003 available from Shin-Etsu Chemical Co., Ltd; or SilGrip SR545 or SilGrip SR1000 available from Momentive Performance Materials may be applied, or a product equivalent to the above may be applied.

A catalyst may be a platinum catalyst, and for example, CAT-PL-50T available from Shin-Etsu Chemical Co., Ltd or a product equivalent to the above may be applied. The catalyst shortens the time of curing and may efficiently form an adhesive layer without substantial damage of a material, even though a transparent film or a material having a characteristic of relative weakness in heat is applied.

The solvent may be for example, toluene, however, the solvent may be applied within a range not to degrade the performance of a silicon adhesive layer without limitation.

The silicon adhesive composition may include a silicon MQ resin in an amount of 5 parts by weight or more, 8 parts by weight or more, 10 parts by weight or more, 20 parts by weight or more, 30 parts by weight or more, or 40 parts by weight or more. The silicon adhesive composition may include a silicon MQ resin in an amount of 90 parts by weight or less, 80 parts by weight or less, 70 parts by weight or less, or 60 parts by weight or less. When the silicon adhesive and the silicon MQ resin are applied together in such a ratio, it is possible to obtain an excellent adhesive force while having a considerable thin thickness.

The silicon adhesive composition may include a catalyst in an amount of 0.5 parts to 2 parts by weight, or 0.8 to 1.5 parts by weight. The catalyst accelerates curing and help an adhesive layer to be efficiently formed from a silicon adhesive composition.

The silicon adhesive composition may further include a solvent, and the solvent may dilute the silicon adhesive composition or give fluidity to the composition for advantages in workability of coating or the like, and may help to form an adhesive layer, which is relatively thin and has excellent properties overall. The solvent may be for example, a toluene, however, any material within the range not to damage the properties of the silicon adhesive composition is applicable without limitation.

For example, the silicon adhesive composition may include a silicon adhesive in an amount of 20 to 30 wt %, a silicon MQ resin in an amount of 2 to 25 wt %, a catalyst in an amount of 0.2 to 0.5 wt %, a solvent in an amount of 50 to 70 wt %.

The silicon adhesive composition may be applied on the other side of the transparent film 20 and may form a silicon-based curable adhesive layer. The silicon adhesive composition may be applied on one surface of a separate material film (not shown) and after that may be laminated on the other side of the transparent film to be formed. However, depending on the process order, drying and curing may proceed immediately after applying, or may proceed as separate processes. The silicon adhesive composition may be coated to form a thin layer, and this layer may be included in an adhesive layer when in the state of being dried before completely cured by heat or light. Before being cured in this manner, a dry layer of the silicon adhesive composition is referred to as the precursor of a silicon-based curable adhesive layer.

A precursor layer may be cured by heat or light to form an adhesive layer 30. For example, a surface to be adhered with the precursor layer is disposed to directly contact with the precursor layer, and thermally cured for 1 to 5 minutes at 90 to 130° C. to form an adhesive layer.

The adhesive layer 30 may include a silicon adhesive-derived repeating unit and a silicon MQ resin-derived repeating unit. The adhesive layer 30 may include the silicon MQ resin-derived repeating unit in an amount of 5 parts by weight or more, 8 parts by weight or more, 10 parts by weight or more, 20 parts by weight or more, 30 parts by weight or more, or 40 parts by weight or more based on the silicon adhesive-derived repeating unit of 100 parts by weight. The adhesive layer 30 may include the silicon MQ resin-derived repeat unit in an amount of 90 parts by weight or less, 80 parts by weight or less, 70 parts by weight or less, or 60 parts by weight or less based on the silicon adhesive-derived repeating unit of 100 parts by weight. In such a case, the adhesive layer may obtain an adhesive force of a sufficient level or more with excellent optical properties even with a thinner thickness.

To have stable characteristics in bending and rolling, it is preferred that the adhesive layer 30 has a value of storage modulus in a certain range. Particularly, in consideration of the possibility of heat generation or the like depending on various environments and apparatus utilized in a display element and the like, it is preferred that the adhesive layer has a modulus and an adhesive force suitable for performing stable performance, within a range of temperature variation on the surface side of apparatus.

The adhesive layer 30 may have a storage modulus of 100 MPa or less, 90 MPa or less, or 80 MPa or less at −40° C. The adhesive layer 30 may have a storage modulus of 0.1 MPa or more at −40° C.

The adhesive layer 30 may have a storage modulus of 100 MPa or less, 90 MPa or less, or 80 MPa or less at −20° C. The adhesive layer 30 may have a storage modulus of 0.1 MPa or more at −20° C.

The adhesive layer 30 may have a storage modulus of 70 MPa or less, 55 MPa or less, or 45 MPa or less at 0° C. The adhesive layer 30 may have a storage modulus of 0.1 MPa or more at 0° C.

The adhesive layer 30 may have a storage modulus of 50 MPa or less, 35 MPa or less, or 25 MPa or less at 20° C. The adhesive layer 30 may have a storage modulus of 0.1 MPa or more at 20° C.

The adhesive layer 30 may have a storage modulus of 20 MPa or less, 15 MPa or less, or 5 MPa or less at 40° C. The adhesive layer 30 may have a storage modulus of 0.1 MPa or more at 40° C.

The adhesive layer 30 may have a storage modulus of 10 MPa or less, 5 MPa or less, or 3 MPa or less at 60° C. The adhesive layer 30 may have a storage modulus of 0.1 MPa or more at 60° C.

The adhesive layer 30 may have an adhesive force of 200 gf/inch or more. Such an adhesive force refers to an adhesive force after curing of the adhesive layer, and the detailed method of evaluation is the same as disclosed in the experimental example described below.

The adhesive layer 30 may have an adhesive force of 200 gf/inch or more, 250 gf/inch or more, 300 gf/inch or more, 350 gf/inch or more, 400 gf/inch or more, 450 gf/inch or more, 500 gf/inch or more, or 550 gf/inch or more. The adhesive layer 30 may have an adhesive force of 2200 gf/inch or less. The adhesive layer 30 may have an adhesive force of 2000 gf/inch or less, 1800 gf/inch or less, 1500 gf/inch or less, 1200 gf/inch or less, or 1000 gf/inch or less.

The adhesive layer 30 may have an adhesive force of 80 gf/inch or more, 100 gf/inch or more, 110 gf/inch or more, 140 gf/inch or more, 150 gf/inch or more, or 160 gf/inch or more per unit thickness (1 μm). The adhesive layer 30 may have an adhesive force of 300 gf/inch or less, or 250 gf/inch or less per unit thickness (1 μm). Forming an adhesive layer having a high adhesive force per unit thickness is advantageous for the adhesive layer to obtain sufficient performance in a thinner thickness. The adhesive force per unit thickness described above may be varied depending on the type or the thickness of an adhesive layer to be applied, and the thickness after being cured is designated as a reference.

The adhesive layer 30 may have a thickness of more than 1 μm.

The adhesive layer 30 may have a thickness of more than 1 μm, 1.5 μm or more, 1.8 μm or more, 2 μm or more, 2.5 μm or more, 3 μm or more, or 3.5 μm or more. The adhesive layer 30 may have a thickness of 20 μm or less, 10 μm or less, 8 μm or less, or 7 μm or less.

The adhesive layer 30 has excellent optical properties.

The adhesive layer 30 is a film having a total light transmittance of 85% or more in accordance with ISO 13468. The transparent film 20 may have a light transmittance of 85% or more. For example, the light transmittance may be 88% or more, 89% or more, or 99% or less.

The adhesive layer 30 may have haze of 3% or less. For example, the haze may be 2% or less, 1.5% or less, or 1% or less. The haze may be more than 0%.

The adhesive layer 30 may have a yellow index (YI) of 3 or less. For example, the yellow index may be 3 or less, 2.8 or less, 2.2 or less, 1.0 or less, 0.8 or less, or 0.5 or less. Also, the yellowing index may be more than 0.

The adhesive layer 30 has a strong adhesive force in addition to excellent optical properties and may help delamination not to occur substantially in the environment of repetitive bending or rolling.

Multilayer Sheet 100

Bending and folding of a multilayer sheet are repetitively performed when the sheet is in the state of a laminate, and therefore, the possibility of the occurrence of delamination and the like on the interface between a transparent film 20 and an adhesive layer 30 is required to be minimized. For the above objectives, an adhesive layer described above is applied, and the difference in storage modulus and the like may be applicable through limitation.

When the storage modulus of a laminate, in which a coating layer 20 has been disposed on a transparent film 10, is referred to as SMm and the storage modulus of the adhesive layer 30 is referred to as SMa, it is preferred that the difference between SMm and SMa is within a certain range. At this time, the difference can be shown as a positive number by subtracting a small value from a large value, and the SMm may have a larger value than the SMa, but the value is not limited thereto.

The difference between SMm and SMa at −40° C. may be 2600 MPa or less, 2500 MPa, or 2400 MPa. The difference between SMm and SMa at −40° C. may be 1200 MPa or more.

The difference between SMm and SMa at −20° C. may be 2500 MPa or less, 2400 MPa or less, or 2300 MPa or less. The difference between SMm and SMa at −20° C. may be 1200 MPa or more.

The difference between SMm and SMa at 0° C. may be 2450 MPa or less, 2350 MPa or less, or 2200 MPa or less. The difference between SMm and SMa at 0° C. may be 1200 MPa or more.

The difference between SMm and SMa at 20° C. may be 2300 MPa or less, 2200 MPa or less, or 2100 MPa or less. The difference between SMm and SMa at 20° C. may be 1200 MPa or more.

The difference between SMm and SMa at 40° C. may be 2300 MPa or less, 2200 MPa or less, or 2100 MPa or less. The difference between SMm and SMa may be 1200 MPa or more.

The difference between SMm and SMa at 60° C. may be 2200 MPa or less, 2100 MPa or less, or 2000 MPa or less. The difference between SMm and SMa at 60° C. may be 1200 MPa or more.

When having such a characteristic, the occurrence of delamination between a laminate and an adhesive layer may be minimized.

The multilayer sheet 30 has excellent optical properties.

The multilayer sheet 30 may have a total light transmittance of 85% or more, 88% or more, 91% or more, or 99% or less in accordance with ISO 13468.

The multilayer sheet 30 may have haze of 3% or less, 2% or less, 1.5% or less, 0.85% or less, or 0.8% or less.

The multilayer sheet 30 may have a yellow index (YI) of 3 or less. For example, the yellow index may be 3 or less, 2.8 or less, 2.2 or less, 1.0 or less, 0.8 or less, or 0.5 or less. Also, the yellow index may be more than 0.

The multilayer sheet 30 has a relatively thin thickness. In detail, the sum of thicknesses of the transparent film 10, the coating layer 20, and the adhesive layer 30 may be 30 μm or more, 40 μm or more, 50 μm or more, 60 μm or more, 70 μm or more, or 80 μm or more, and may be 200 μm or less, or 150 μm or less.

The adhesive layer 30 may have a characteristic in the thickness after being cured, which is two times or less of the thickness of the coating layer 20. The thickness after being cured of the adhesive layer 30 may be 1.8 times or less, 1.5 times or less, 1.3 times or less, 1.1 times or less, or 1.0 times or less of the thickness of the coating layer 20. The thickness after being cured of the adhesive layer 30 may be 0.1 times or more, or 0.2 times or more of the thickness of the coating layer 20. The above cases have a relatively thin thickness of the adhesive layer, and it is possible to provide a multilayer sheet having a thin thickness overall, due to reduction of the thickness of the multilayer sheet 30 except for the thickness of the transparent film 10 functioning as a supporter.

The sum of thicknesses of the coating layer 20 and the adhesive layer 30 may be 30 µm or less, 25 µm or less, 20 µm or less, 15 µm or less, or 12 µm or less. The sum of the coating layer 20 and the adhesive layer 30 may be 2 µm or more.

Additionally, the multilayer sheet 100 has a thin adhesive layer 30 compared to the transparent film 10. In the periphery of the interface between the transparent film and the adhesive layer, delamination of layers or damage of the transparent film may be relatively easily caused when the film is bended or rolled. In an embodiment, an adhesive layer is constructed to have a thin thickness and a strong adhesive force, to address such a problem. In addition, even though the same resin is applied, the adhesive force may be different depending on the thickness of the adhesive layer, and therefore, it is preferred that the thickness ratio of the transparent film and the adhesive film has characteristics as follows. In detail, the thickness of the transparent film may be 8 to 60 times, or 8 to 40 times of the unit thickness of the adhesive layer (1 µm).

The multilayer sheet 100 may further include a release film 40 disposed on the other side of the adhesive layer 30. The release film 40 may be disposed to directly contact with the other side of the adhesive layer 30. The release film 40 may be disposed on the other side of the adhesive layer with another layer therebetween as an intervening medium.

The release film may be a polyethylene terephthalate film, but is not limited thereto.

The multilayer sheet 30 has an adhesive layer 30 applied thereto with a strong adhesive force and a relatively thin thickness, and thereby a thin multilayer sheet, in which delamination is substantially suppressed even though bending, folding, rolling, and the like are repeated, may be provided.

Multilayer Electronic Device 200

Figure 3:
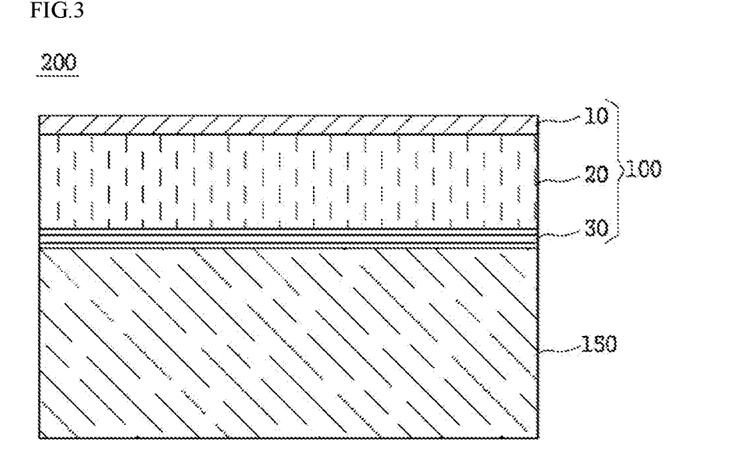
FIG. 3 is a conceptual sectional view for illustrating the structure of a multilayer electronic device according to one embodiment.
Figure 4:
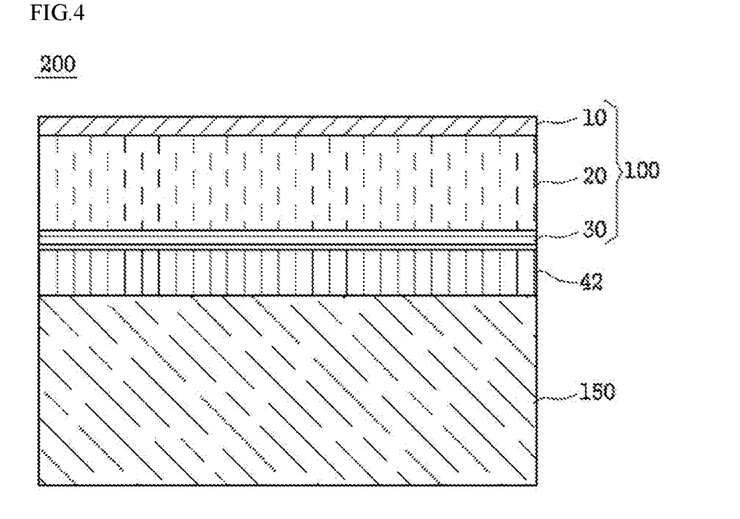
FIG. 4 is a conceptual sectional view for illustrating the structure of a multilayer electronic device according to another embodiment.

FIG. 3 is a sectional conceptual view for illustrating the structure of a multilayer electronic device according to another embodiment, and FIG. 4 is a sectional conceptual view for illustrating the structure of a multilayer electronic device according to another embodiment. Referring to the FIG. 3 and FIG. 4, the multilayer electronic device 200 will be described in detail.

The multilayer electronic device 200 includes a multilayer sheet 100; and a radiant functional layer 15 disposed on the multilayer sheet 100.

The multilayer sheet 100 may be applied as a cover layer of the multilayer electronic device 200.

The multilayer electronic device 200 may be for example, a display device, and for example, may be a large-sized display device, a foldable display device, a bendable display device, or a flexible display device. Also, the multilayer electronic device 200 may be a bendable mobile communication device (e.g., mobile phone) or a bendable laptop.

The radiant functional layer 150 may include a light emitting layer (not shown).

The light emitting layer may include an element emitting a light depending on a signal from a display device. The light emitting layer may, for example, may include a signal transmitting layer of transmitting an electric signal from the external to a coloring layer, a coloring layer disposed on the signal transmitting layer and coloring depending on the given signal, and an encapsulated layer for protecting the coloring layer. The signal transmitting layer may include Thin Fim Transistor (TFT), and for example, LIPS, a-SiTFT, or Oxide TFT may be applied as the TFT, however, the type of TFT is not limited thereto. Thin Film Encapsulation (TFE) may be applied to the encapsulated layer, however, the layer is not limited thereto.

The light emitting layer may be disposed on a supporting layer. The supporting layer may be a layer having an insulating characteristic and a heat resistance characteristic, and for example, a polyimide film, a glass layer, and a PET film may be used.

The radiant functional layer may further include a sensor layer. As the sensor layer, a touch sensor may be applied.

The radiant functional layer may further include a polarized light layer. The polarized light layer may be disposed on the light emitting layer, or may be disposed on the sensor layer.

Hereinafter, the present disclosure will be described in further detail with reference to accompanying examples. The following embodiments are only examples for understanding the present disclosure, and the range of the present disclosure is not limited to the same.

1. Manufacture of Adhesive Composition

KR-3700 available from Shin-Etsu Chemical Co., Ltd as a silicon adhesive; X-92-128 available from Shin-Etsu Chemical Co., Ltd as a silicon MQ resin, and CAT-PL-50T available from Shin-Etsu Chemical Co., Ltd as a platinum-based catalyst, and toluene as a solvent were prepared. A composition for an adhesive layer was applied after being mixed in the amount disclosed in Table 1 below.

2. Formation of Adhesive Layer and Property Test of Adhesive Layer after being Cured The composition for an adhesive layer was dried after being die-coated on a PET film (manufactured by SKC corporation to be NRF grade) to have a thickness disclosed in Table 1 below after being cured. The drying and curing proceeded for 5 minutes at a temperature of 90° C.

For a test for adhesive force, QC-N1 F UTM model available from COMETECH corporation was used and measured an adhesive force in the form of T-Peel, and at this time, delamination rate was 300 mm/min.

TABLE 1

| | Weight Ratio (wt %) | | | |
| --- | --- | --- | --- | --- |
| | Manufacture Example 1 for Composition | Manufacture Example 2 for Composition | Manufacture Example 3 for Composition | Manufacture Example 4 for Composition |
| Silicon Adhesive (wt %) | 32.787 | 29.851 | 27.397 | 25.316 |
| Silicon MQ Resin (wt %) | 0 | 7.164 | 13.151 | 18.228 |
| Catalyst (wt %) | 0.328 | 0.299 | 0.274 | 0.253 |

TABLE 1-continued

| | | | | |
|---|---|---|---|---|
| Solvent (wt %) | 66.885 | 62.686 | 59.178 | 56.203 |
| The Amount of Silicon MQ Resin (Parts by Weight)* | 0.000 | 23.999 | 48.002 | 72.002 |
| The Amount of Catalyst (Parts by Weight)* | 1.000 | 1.002 | 1.000 | 0.999 |

| | Adhesive Force (gf/inch) | | | |
|---|---|---|---|---|
| Thickness after Being Cured (um)** | Manufacture Example 1 of Adhesive Layer | Manufacture Example 2 of Adhesive Layer | Manufacture Example 3 of Adhesive Layer | Manufacture Example 4 of Adhesive Layer |
| 1 | 40 | 33 | 60 | 67 |
| 2 | 375 | 400 | 223 | 43 |
| 3 | 489 | 570 | 174 | 60 |
| 4 | 583 | 648 | 541 | 115 |

| | Adhesive Force (gf/inch) | | | |
|---|---|---|---|---|
| Adhesive Force per Unit Thickness*** | Manufacture Example 1 of Adhesive Layer | Manufacture Example 2 of Adhesive Layer | Manufacture Example 3 of Adhesive Layer | Manufacture Example 4 of Adhesive Layer |
| Adhesive Layer with Total Thickness of 1 μm | 40 | 33 | 60 | 67 |
| Adhesive Layer with Total Thickness of 2 μm | 187.5 | 200 | 111.5 | 21.5 |
| Adhesive Layer with Total Thickness of 3 μm | 163 | 190 | 58 | 20 |
| Adhesive Layer with Total Thickness of 4 μm | 145.75 | 162 | 135.25 | 28.75 |

*The amount is based on a silicon adhesive of 100 parts by weight.
**The adhesive force is measured from the thickness of a corresponding adhesive layer.
***The value is obtained by dividing the adhesive force measured from a corresponding adhesive layer by the thickness, and expressed as adhesive force per unit thickness (1 μm), or gf/(inch · μm).

With reference to the Table 1, when the thickness of an adhesive layer is increased, the adhesive force had a tendency of being enhanced substantially, and when compared in the same thickness except for the case of 1 μm, Manufacture Example 2 of Adhesive Layer, to which Manufacture Example 2 for Composition had been applied, was the most excellent overall. However, the cases of Manufacture Example 1 and Manufacture Example 3 also showed an excellent adhesive force depending on the variation in the thickness.

When the adhesive force value per unit thickness, which was to confirm the adhesive force to the thickness, was reviewed, the tendency of adhesive force, which was increased as the thickness was increased overall, was shown, however, the tendency of the increasing range, which was gradually decreased, was also shown even though an identical composition was applied.

It was verified that an adhesive layer having a sufficient adhesive force have been obtained while having a relatively thin thickness.

3. Manufacture of Multilayer Sheet

Respective PET films manufactured by SKC corporation with NRF grade were obtained by thicknesses to be applied as transparent films.

To prepare a coating layer, a composition for manufacturing a coating layer having a composition of Table 2 below was coated on one side of a transparent film by a die-coating method. After that, the coated film was thermally treated for 3 minutes at a temperature of 60° C. to dry a solvent, and irradiated by UV light of 1 J to perform curing, thereby forming a coating layer with a thickness of about 5 μm.

TABLE 2

| Index | Ingredient | wt % |
|---|---|---|
| Solvent | Propylene glycol methyl ether | 22.5 |
| | Methyl isobutyl ketone | 52.5 |
| Binder | Urethane acrylate | 12.9 |
| | Acrylic ester | 3.8 |
| | Acrylate | 7.3 |
| Light Initiator | 1-Hydroxycyclohexyl phenyl ketone | 0.8 |
| Anti-foulant | Perfluorohexylethyl acrylate | 0.2 |

Samples, to which an adhesive layer had been applied, were made as follows. An adhesive composition was applied on the other side of a transparent film of a laminate (a transparent film with a coating layer formed on one side of the film) to be the same as described above, and dried to form a precursor layer, and the laminate was cured to form an adhesive layer. The composition was applied by one of Manufacture Example 2 for Composition. The detailed layer structure and the thickness of each layer were the same as indicated in Table 3 below.

4. Property Test of Multilayer Sheet
(1) Optical Properties and Color

The optical properties and color were measured. A haze meter (NDH-5000W available from Nippon Denshoku corporation) was used to measure the average transmittance of visible light of a film sample in accordance with ISO13468 standard, and haze was measured in accordance with ISO 14782 standard. The yellow index of a sample was measured by using a spectrometer (UltraScan PRO available from Hunter Associates Laboratory) and a light source of D65 under the condition of 10° in accordance with ASTM-E313 standard. The results are shown in Table 4 below.

A case of having a light transmittance of 85% or more is indicated as ○, and a case of having a light transmittance of 91% or more is indicated as ◎.

A case of having haze of 1% or less is indicated as △, a case of having haze of 0.85 or less is indicated as ○, and a case of having haze of 0.8% or less is indicated as ◎.

A case of having Y.I of more than 0.8 is indicated as △, a case of having Y.I of 0.8 or less is indicated as ○, and a case of 0.5 or less is indicated as ◎.

(2) Measurement of Thickness

Thickness of each layer is measured by F-20 apparatus available from Filmetrics corporation according to a manual of the manufacturer. The results measured from three to five points within a sample were checked and the average value was taken as the thickness of the sample.

(3) Evaluation for Folding Durability

An example of a multilayer film was bonded to an elastic layer in the thickness of 35 μm (a monolayer extruded film manufactured by SKC corporation, when applying PEBA 72R Grade resin available from Arkema France), and after that, a dynamic folding test was performed for measuring folding durability. After the dynamic folding test was performed 200,000 times under the radius of curvature of 2 mm and the folding frequency of 2 sec/time, whether a crack occurred was checked. Whether a crack occurred was observed and judged with the naked eye. All the multilayer films as samples of Examples did not exhibit a crack when observed with the naked eye, and therefore were evaluated as having a good condition.

TABLE 3

|  | Multilayer Film Comparative Example 1 | Multilayer Film Comparative Example 2 | Multilayer Film Comparative Example 3 | Multilayer Film Comparative Example 4 | Multilayer Film Comparative Example 5 | — |
|---|---|---|---|---|---|---|
| Thickness of Coating Layer, μm | 5 | 5 | 5 | 5 | 5 | — |
| Thickness of Transparent Film, μm | 50 | 65 | 75 | 90 | 100 | — |
| Thickness of Adhesive Layer, μm | — | — | — | — | — | — |
| Thickness of Elastic Layer, μm | — | — | — | — | — | — |
| Transmittance (%) | ◎ | ◎ | ◎ | ◎ | ◎ | — |
| Haze (%) | ○ | ○ | ○ | △ | △ | — |
| Yellow Index | ○ | △ | ○ | △ | △ | — |

|  | Multilayer Film Example 1 | Multilayer Film Example 2 | Multilayer Film Example 3 | Multilayer Film Example 4 | Multilayer Film Example 5 | Multilayer Film Example 6 |
|---|---|---|---|---|---|---|
| Thickness of Coating Layer, μm | 5 | 5 | 5 | 5 | 5 | 5 |
| Thickness of Transparent Film, μm | 50 | 50 | 50 | 65 | 65 | 65 |
| Thickness of Adhesive Layer, μm | 2 | 3 | 4 | 2 | 3 | 4 |
| Thickness of Elastic Layer, μm | 35 | 35 | 35 | 35 | 35 | 35 |
| Transmittance (%) | ◎ | ◎ | ◎ | ◎ | ◎ | ◎ |
| Haze (%) | ◎ | ○ | ◎ | △ | △ | ◎ |
| Yellow Index | ○ | ○ | ○ | ○ | ○ | ○ |

|  | Multilayer Film Example 7 | Multilayer Film Example 8 | Multilayer Film Example 9 | Multilayer Film Example 10 | Multilayer Film Example 11 | Multilayer Film Example 12 |
|---|---|---|---|---|---|---|
| Thickness of Coating Layer, μm | 5 | 5 | 5 | 5 | 5 | 5 |
| Thickness of Transparent Film, μm | 75 | 75 | 75 | 90 | 90 | 90 |
| Thickness of Adhesive Layer, μm | 2 | 3 | 4 | 2 | 3 | 4 |
| Thickness of Elastic Layer, μm | 35 | 35 | 35 | 35 | 35 | 35 |

TABLE 3-continued

| | | | | | | |
|---|---|---|---|---|---|---|
| Transmittance (%) | ◎ | ◎ | ◎ | ○ | ○ | ○ |
| Haze (%) | ○ | ○ | ○ | ○ | Δ | ○ |
| Yellow Index | ○ | ○ | ○ | ○ | ○ | ○ |

Modulus was measured through DMA (Dynamic mechanical analysis). Samples were measured for storage modulus in the range of −50° C. to 100° C. by using DMA 7100 model available from HITACHI corporation. The heating speed was 5° C./min.

The measured results at each temperature were shown in Table 4 below.

TABLE 4

| | Storage Modulus (MPa) | | | | |
|---|---|---|---|---|---|
| Temperature (° C.) | Multilayer Film Comparative Example 1 | Multilayer Film Comparative Example 2 | Multilayer Film Comparative Example 3 | Multilayer Film Comparative Example 4 | Adhesive Layer Manufacture Example 2 |
| −40 | 2400 | 2500 | 2500 | 2300 | 77.00 |
| −20 | 2400 | 2300 | 2200 | 2100 | 50.00 |
| 0 | 2400 | 2300 | 2000 | 1900 | 33.00 |
| 20 | 2300 | 2200 | 1900 | 1800 | 12.00 |
| 40 | 2300 | 2100 | 1800 | 1700 | 2.90 |
| 60 | 2100 | 2000 | 1700 | 1600 | 0.24 |

| | Storage Modulus (MPa) | | | | |
|---|---|---|---|---|---|
| Temperature (° C.) | Average Multilayer Film Comparative Example | Average SMm-SMa | SMm1-SMa | SMm2-SMa | SMm3-SMa |
| −40 | 2425 | 2348 | 2323 | 2423 | 2423 |
| −20 | 2250 | 2200 | 2350 | 2250 | 2150 |
| 0 | 2150 | 2117 | 2367 | 2267 | 1967 |
| 20 | 2050 | 2038 | 2288 | 2188 | 1888 |
| 40 | 1975 | 1972 | 2297 | 2097 | 1797 |
| 60 | 1850 | 1850 | 2100 | 2000 | 1700 |

With reference to Table 3 and Table 4, it was confirmed that samples of Examples had excellent optical properties overall and excellent folding durability. Such a sample is thin but has a strong adhesive force and thereby make a multilayer sheet having a difference in modulus within a proper range adhere to itself well, in a wide temperature range. Additionally, according to the above, the sample can substantially suppress delamination and the like even though repetitive folding is performed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer sheet comprising:
   a transparent film with a total light transmittance of 85% or more in accordance with ISO 13468-1:2019, published in 2019 and currently in effect;
   a coating layer disposed on a first surface of the transparent film; and
   an adhesive layer disposed on a second surface, opposite to the first surface, of the transparent film,
   wherein a thickness of the adhesive layer after being cured is two times or less of a thickness of the coating layer, and
   wherein the adhesive layer comprises a silicon adhesive-derived repeating unit and a silicon MQ resin-derived repeating unit.

2. The multilayer sheet of claim 1,
   wherein the adhesive layer has an adhesive force of 80 gf/inch or more per unit thickness (1 μm).

3. The multilayer sheet of claim 1,
   wherein when a storage modulus of a laminate consisting of the transparent film and the coating layer disposed on the first surface of the transparent film is referred to as SMm and a storage modulus of the adhesive layer is referred to as SMa, a difference between the SMa and the SMm at 0° C. is 2450 MPa or less.

4. The multilayer sheet of claim 1,
   wherein a storage modulus of the adhesive layer is 0.1 MPa or more at 60° C.

5. The multilayer sheet of claim 1,
   wherein when a storage modulus of a laminate consisting of the transparent film and the coating layer disposed on the first surface of the transparent film is referred to as SMm and a storage modulus of the adhesive layer is referred to as SMa, a difference between the SMa and the SMm at 60° C. is 2200 MPa or less.

6. The multilayer sheet of claim 1,
wherein the adhesive layer has an adhesive force of 200 gf/inch or more after being cured.

7. The multilayer sheet of claim 1,
wherein the adhesive layer has a thickness of 1 μm or more after being cured.

8. The multilayer sheet of claim 1,
wherein a sum of thicknesses of the coating layer and the adhesive layer is 30 μm or less.

9. The multilayer sheet of claim 1,
wherein the multilayer sheet further comprises a release film disposed on a surface of the adhesive layer, wherein the adhesive layer is disposed between the transparent film and the release film.

10. The multilayer sheet of claim 1,
wherein the adhesive layer comprises the silicon MQ resin-derived repeating unit in an amount of 5 parts by weight to 90 parts by weight based on the silicon adhesive-derived repeating unit of 100 parts by weight.

11. A multilayer electronic device comprising:
a multilayer sheet comprising:
a transparent film with a total light transmittance of 85% or more in accordance with ISO 13468-1:2019, published in 2019 and currently in effect;
a coating layer disposed on a first surface of the transparent film; and
an adhesive layer disposed on a second surface, opposite to the first surface, of the transparent film; and
a radiant functional layer disposed on a surface of the adhesive layer of the multilayer sheet,
wherein the adhesive layer is disposed between the transparent film and the radiant functional layer, and
wherein the adhesive layer comprises a silicon adhesive-derived repeating unit and a silicon MQ resin-derived repeating unit.

12. The multilayer electronic device of claim 11,
wherein a thickness of the adhesive layer after being cured is two times or less of a thickness of the coating layer.

13. The multilayer electronic device of claim 11,
wherein the adhesive layer has an adhesive force of 80 gf/inch or more per unit thickness (1 μm).

14. The multilayer electronic device of claim 11,
wherein when a storage modulus of a laminate consisting of the transparent film and the coating layer disposed on the first surface of the transparent film is referred to as SMm and a storage modulus of the adhesive layer is referred to as SMa, a difference between the SMa and the SMm at 0° C. is 2450 MPa or less.

15. The multilayer electronic device of claim 11,
wherein a storage modulus of the adhesive layer is 0.1 MPa or more at 60° C.

16. The multilayer electronic device of claim 11,
wherein the adhesive layer has an adhesive force of 200 gf/inch or more after being cured.

17. The multilayer electronic device of claim 11,
wherein a sum of thicknesses of the coating layer and the adhesive layer is 30 μm or less.

18. The multilayer electronic device of claim 11,
wherein the multilayer electronic device further comprises an elastic layer disposed between the adhesive layer and the radiant functional layer.

19. The multilayer sheet of claim 11,
wherein the adhesive layer comprises the silicon MQ resin-derived repeating unit in an amount of 5 parts by weight to 90 parts by weight based on the silicon adhesive-derived repeating unit of 100 parts by weight.

* * * * *